United States Patent Office 3,302,644
Patented Feb. 7, 1967

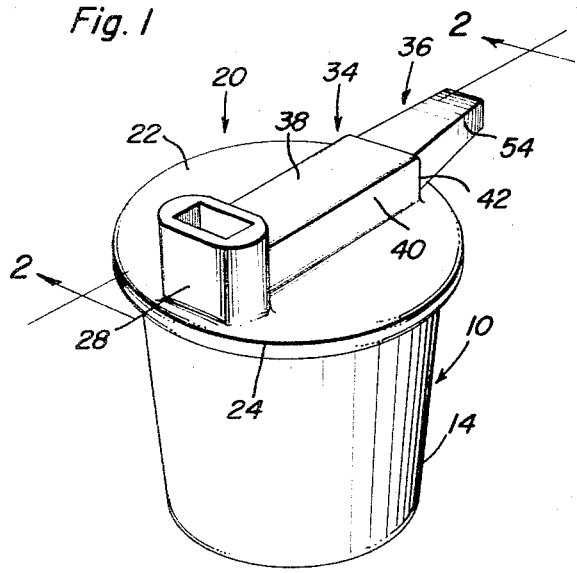
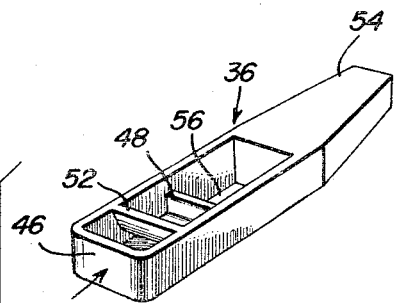
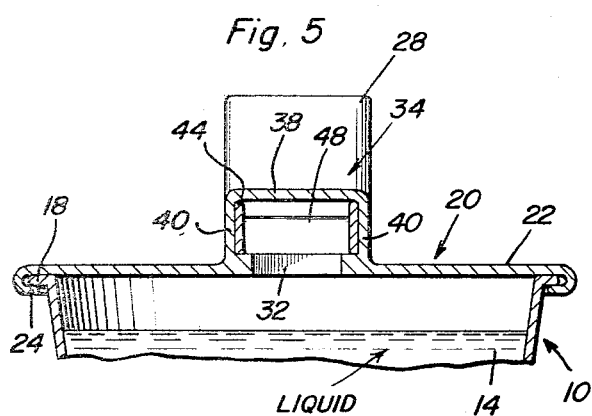
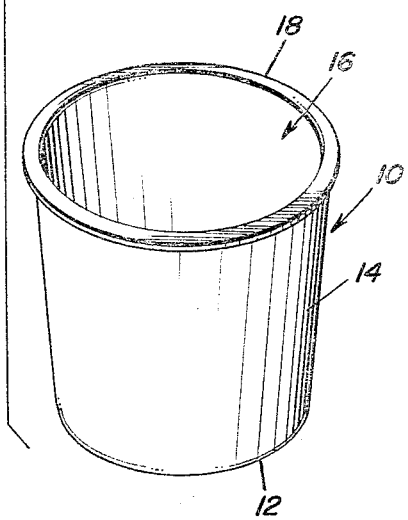
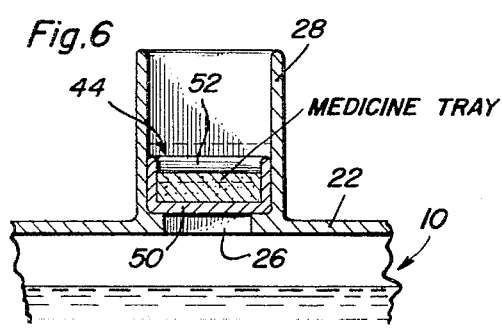
Harold J. Kennedy
Renos E. Haltom
INVENTORS

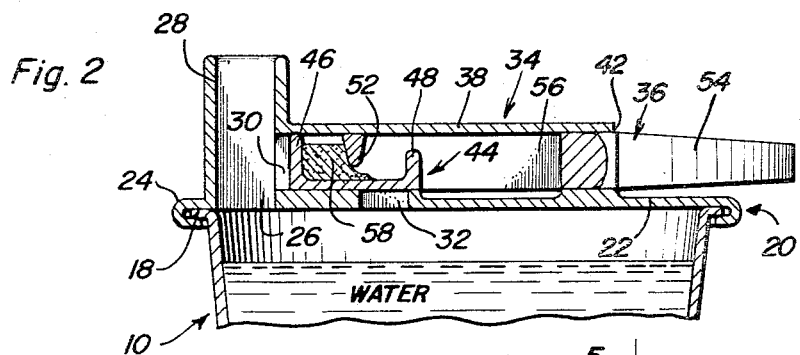
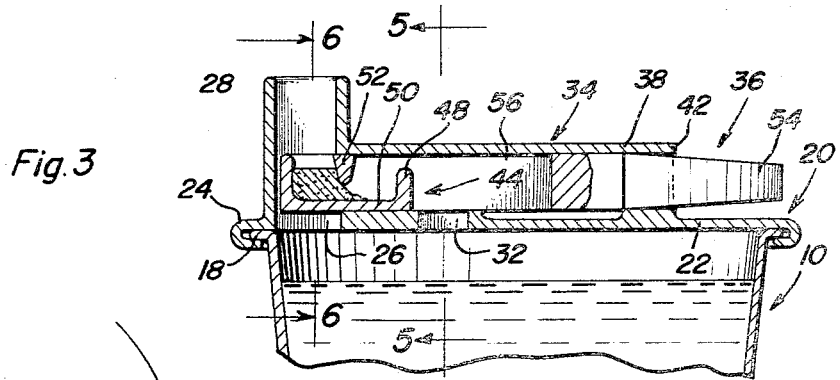
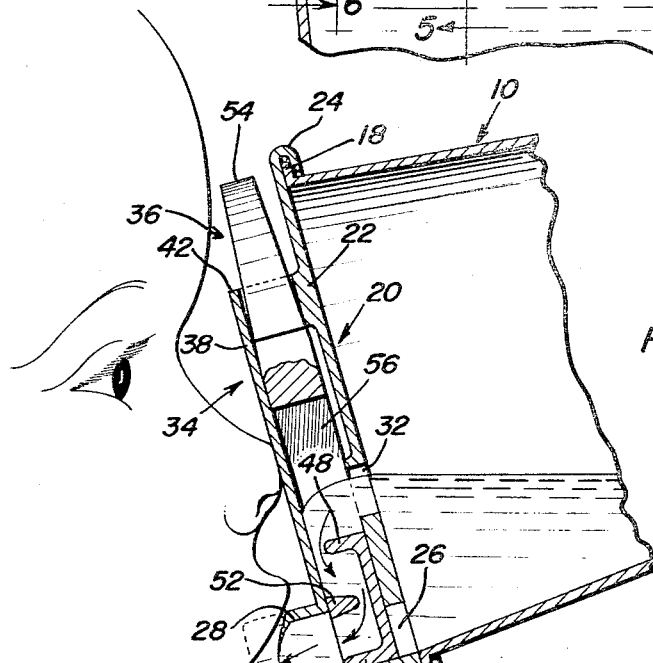
Harold J. Kennedy
Renos E. Haltom
INVENTORS

3,302,644
ORAL MEDICINE ADMINISTERING DEVICE
FOR CHILDREN
Harold J. Kennedy, R.R. 2, and Renos E. Haltom, R.R. 3,
both of Cloverdale, Ind. 46120
Filed July 26, 1963, Ser. No. 297,873
10 Claims. (Cl. 128—222)

This invention relates to an improved device which is expressly constructed and uniquely adapted to enable an adult user thereof to safely and reliably administer a dose of medicine to a child.

Many children are fearfully skeptical when called upon to take a dose of medicine whether it be in the form of a powder, pill or liquid. Such reluctance and attending difficulties invariably pose a problem for doctors, nurses, and parents in particular. As a matter of fact, swallowing a pill or capsule, if it be large or otherwise difficult to cope with is an emotional chore for all concerned.

Persons conversant with the art to which the invention relates are aware that the problem has prompted the adoption and use of a number of devices which seek to solve the problem. But the fact that such contrivances appear not to have met with widespread adoption and use has been the stimulus and incentive in the instant matter to devise and offer for practical use the special adaptation which will be hereinafter disclosed. To the ends desired, an innovation has been perfected.

Briefly, the device comprises a container, for example, a suitable liquid containing cup. This cup is filled with water, milk, fruit juice or the like which, according to plan, can be swallowed before, after or in conjunction with the dosage of medicine, as will be hereinafter explained. A structurally unique cover is provided, said cover having snap-on fastening means and featuring an outstanding nipple-like neck or spout which is placed in a container-emptying position in the youngster's mouth. The cover is equipped with a built-in medicine holder, preferably a sliding tray, and this tray is controllable by the adult user. It is so constructed and arranged that when it is in a dispensing position it has communication with the receptacle portion of the container and also the discharge neck and, when deftly and appropriately handled, the child partakes of the medicine unaware of any attending difficulty.

In accordance with the facilities provided the chlid is permitted to first take a drink of the liquid (drinking water, milk if desired, or a tasty disguising-type fruit juice) or, alternatively, the medicine can be administered first and then followed by the liquid. Or, the liquid can be mixed with the medicine and both taken at the same time. Accordingly, the invention constitutes a multipurpose adaptation affording the user a choice of usage in keeping with the nature of the matter at hand.

One improvement resides in providing a simple easyto-use cup-type container having a flanged top to which a channel-shaped attaching rim on the lid or cover is separably connectible in a snap-on manner, whereby to facilitate filling the receptacle portion with the drinking and wash-down liquid desired.

Another improvement has to do with the lid-type cover. This cover has an outer port near the rim with which the hollow neck is communicatively connected. The cover also has a second or inner discharge port which is openable and closable at will and which, when open delivers the liquid to the neck by way of a side orifice or opening in said neck to accomplish a result later to be revealed.

Further, a handle-equipped slide is mounted in an enclosing sheath or sleeve atop the cover. This slide is provided at the inward enclosed end with a medicine tray which is projectible into the neck when delivering the medicine and which also functions as a closing valve for both the neck and said inner port when in a given intended position relative thereto.

Then, too, the slide is not only novel for the above stated functions, it has a liquid-flow retarding and medicine flushing baffle in the tray portion, and a liquid feeding slot in the handle portion which is selectively registrable with the aforementioned second-named port for a purpose which will be hereinafter more specifically set forth.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing the assembled ready-to-use medicine administering device constructed in accordance with the present invention;

FIGURE 2 is an enlarged view with parts in section and elevation taken on the plane of the section line 2—2 of FIG. 1 looking in the direction of the arrows;

FIGURE 3 is a view similar to and in fact based on FIG. 2 but showing the projectible and retractible slide unit, including the medicine holding tray, which has been shoved in a position from right to left (FIG. 2) in order to bring the medicine tray in registering alignment with the discharge neck;

FIGURE 4 is also a view based on FIGS. 2 and 3 and more specifically on FIG. 3 and which shows one of the procedural steps which is optionally followed and wherein the water or other liquid from the container is functioning to bypass the discharge neck and is consequently flushing and dispensing the medicine directly into the mouth of the child;

FIGURES 5 and 6 are views in section and elevation taken on the vertical section lines 5—5 and 6—6, respectively, of FIG. 3; and FIGURE 7 is an exploded perspective view illustrating the three principal or component parts of the overall device.

With reference first to FIG. 7, it will be evident that the numeral 10 designates the liquid container. This container comprises a drinking cup of appropriate capacity and material having a bottom 12, a tapering body portion 14 and which is open at its top, as at 16 and there provided with an outstanding endless assembling and an attaching flange 18 for the readily attachable and detachable cover means 20. The means 20 comprises a disk-like lid 22 which is provided on its marginal edge with an attaching and retaining rim 24 which can be snapped over the assembling flange 18. This rim is channel-shaped in cross-section and the material used in constructing the flange 18 and rim 24 is such that the rim can be snapped on and off and when in position it provides a substantially liquid-tight connection between the cover and container. With reference now to FIGS. 2, 3, and 4 in particular it will be seen that the lid is provided adjacent one marginal edge portion with a first liquid discharge port 26 which constitutes the intake for the aligned discharge neck 28. This neck projects upwardly from the top of the lid and is substantially ovate in plan and provides a nipple-like pouring or drinking spout which can be inserted into the mouth of the youngster in the manner shown in FIG. 4. It will be noted that the neck is provided on an interior side with an opening 30 which is here differentiated as an orifice. It will be further noted that the lid is provided inwardly of the port 26 and orifice 30 with a second port 32.

The lid is further provided with means for valving and controlling the ports 26 and 32 as well as the orifice 30 (FIGS. 2, 3 and 4). A significant part of this means comprises an elongated rectangular sleeve-like sheath 34 which provides a housing and guide for the projectible and retractible slide unit denoted as an entity by the numeral 36 (FIG. 7). The sheath embodies a top wall 38 and spaced parallel lengthwise side walls 40. The inner open end of this sheath is integral with the neck 28 and in line with the orifice 30. The opposite end, the outer end, is open as at 42. It will be further noted that the hollow portion of the sheath is directly in line with the port 32 and in fact has communication with the port to accomplish the several progressive results depicted in FIGS. 2, 3 and 4. The walls of the sheath are, of course, imperforate.

The slide unit 36 is of one piece construction and is precision-made to have sliding but liquid-tight fit in the hollow portion of the sheath. The left-hand end portion in the drawings is fashioned into a medicine tray 44 one end of which is denoted at 46 and the other end at 48. It will be noted that the end wall 48 terminates in a plane below the upper edge of the wall 46. It will be further noticed that the bottom 50 of the tray is flat and when in the position illustrated in FIG. 2 it provides a closing valve for the inward port 32. When in this same position the wall 46 closes and provides a valve for the orifice 30. Then, too, the tray is provided between the walls 46 and 48 with a depending baffle 52 whose bottom edge is spaced in parallelism above the median portion of the bottom of the tray thus providing a tortuous and restricted passage for the fluid in the manner illustrated in FIG. 4. Further, the slide unit has a shank or handle portion 54 which is suitably shaped and constructed to project through and beyond the open end 42 where it is accessible for sliding the unit or tray in and out. Further, the median portion of this shank or handle is provided with an elongated slot 56 which provides an exit for the fluid when the slot is aligned with the port 32 as illustrated in FIGS. 3 and 4. The dose of medicine is denoted in the tray at 58.

It will be understood that the several companion or complemental units, the container 10, the lid or cover 20 and the tray-equipped slide 36 will be precision-made and constructed of materials elected for such purpose by the manufacturer. The size and capacity of the cup or container unit 10 will also be governed in keeping with the requirements of experience and with a view toward providing sufficient liquid in the receptacle portion 16 to permit the recipient to partake of the same in whole or in part depending upon whether the liquid is taken as a first step (FIG. 2) or is mixed and used as a follow-up liquid as illustrated in FIG. 4.

In using the invention the receptacle portion of the container or cup is filled with liquid, usually drinking water, but if desired milk or a taste-disguising fruit juice. Then, the multipurpose lid or cover is snapped in place and retained by the flange and coacting assembly rim on the cover. Next, the slide unit is withdrawn from its housing or sheath, the tray is charged with the prescribed medicine, and the slide again inserted into the sheath in readiness for use (see FIG. 2). When in this position the flat bottom of the tray covers the port 32 and the neck is open. Assuming that it has been decided to start the procedure by giving the youngster water, milk or juice, the device is positioned as shown in FIG. 4 and this step is taken care of. A swallow or two of the liquid will serve this purpose. Should it be decided that the medicine should be taken first, the tray is positioned as illustrated in FIG. 3 and then when the device is handled as shown in FIG. 4, the liquid will follow and mix with the medicine and flush and dispense it from the tray. Then, the tray can be quickly retracted (FIG. 2) to allow the remaining liquid to pass directly into and out through the neck. Experience will show which practice is best.

It is submitted that a careful consideration of the specification in conjunction with the illustrative, but not restrictive, views of the drawings, will enable the reader to obtain a clear and comprehensive understanding of the construction and arrangement of the parts 14, 20 and 36, the features and advantages and preferred manner of utilizing the same. Therefore, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A medicine dispensing liquid container including a wall closing said container, said wall including a pair of liquid passing ports therethrough, a common liquid discharge opening defined on said wall and communicated with said ports for the selective reception and discharge of liquid therefrom, means for selectively closing each port while simultaneously opening the other port, said selective closing means including a medicine receptacle, and means diverting fluid flow from said one of said ports through said receptacle for subsequent discharge through said discharge opening.

2. For use by an assistant when administering a dose of medicine to a child; a multipurpose device comprising, in combination, a container having a receptacle portion for a swallow or more of liquid, water for example, said container being open at its top, a liquid-tight cover engaged over said open top, said cover having a first restricted liquid drinking port and also having a nipple-like neck in line with said port and projecting from said cover and designed and adapted to enter the mouth of the child so that the liquid from the receptacle portion can be restrictively poured into the child's mouth before or, alternatively, after the medicine is taken, and means carried by said cover for holding the prescribed dose of medicine, said cover being provided with a sheath in fluid communication with said neck, said means being slidingly and removably mounted in said sheath, said cover having a second restricted port spaced from said first port and opening into said sheath, said second port serving, when intentionally opened, to indirectly feed liquid flowing from the receptacle portion through said sheath to said neck and being communicable at will with said medicine holding means, the latter having the additional function of a valve and serving to selectively close either of said ports.

3. For use by an assistant when administering a dose of medicine to a child; a multipurpose device comprising, in combination, a container having a receptacle portion for a swallow or more of liquid, water for example, said container being open at its top, a liquid-tight cover engaged over said open top, said cover having a first restricted liquid drinking port and also having a nipple-like neck in line with said port and projecting from said cover and designed and adapted to enter the mouth of the child so that the liquid from the receptacle portion can be restrictively poured into the child's mouth before, after or while the dose of medicine is being administered, said cover having a second restricted port spaced from said first port and also communicable with said receptacle portion, said neck being provided in a side thereof with tray inlet orifice, a sheath fixed atop said cover directly over and in line with said second port, said sheath having an inner open end portion joined to said neck via said orifice and functioning in part to deliver liquid from said second port to the neck via said orifice, and a medicine tray confined and slidingly mounted in said sheath, said tray serving not only as a holder for a prescribed dose of medicine but also as a valve for selectively opening and closing said first and second ports.

4. For adult use when administering a prescribed dose of medicine to a child; an open-top liquid container, and a readily attachable and detachable lid providing a cover for the top of said container, said lid having means mounting the same in a liquid-tight manner atop said container, a first liquid discharge port provided in a marginal edge portion of said lid, an upstanding spout-like drinking neck integral with the top of the lid and in communicable alignment with said port, said neck having an orifice in one side proximal to the top of the lid, said lid having a second liquid discharge port spaced inwardly from the first port, and means connecting said second port and said neck for selective fluid communication therebetween, said last-mentioned means including manually adjustable means operatively mounted atop said lid for closing either of said ports at will, said manually adjustable means embodying a medicine holder aligned with said orifice and slidable through said orifice into the hollow portion of said neck.

5. The structure according to claim 4, and wherein said container is provided at its top with an outstanding lid attaching and retaining flange, said lid having a marginal flange, channel-shaped in cross-section and designed and adapted to snap over said retaining flange.

6. For adult use when administering a prescribed dose of medicine to a child: an open-top liquid container, and a readily attachable and detachable lid providing a cover for the top of said container, said lid having means mounting the same in a liquid-tight manner atop said container, a first liquid discharge port provided in a marginal edge portion of said lid, an upstanding spout-like drinking neck integral with the top of the lid and in communicable alignment with said port, said neck having an orifice in one side proximal to the top of the lid, said lid having a second liquid discharge port spaced inwardly from the first port, an open-ended sleeve-like sheath fixed atop said lid directly over said second port and having its inner open end joined to said neck in communicating alignment with said side orifice, a medicine holding tray slidingly confined in said sheath when in use, said tray also providing a valve and being shiftable from a first position closing said second port to a second position opening said port and closing said first port, said tray provided with a handle projecting through the outer open end of said sheath and accessible for shifting and removing the tray.

7. The structure according to claim 6, and wherein said tray is flat-bottomed and provided at a median part of its receptacle portion with a liquid controlling baffle with a bottom edge spaced slightly above the tray's bottom.

8. The structure according to claim 6, and wherein said tray is flat-bottomed and provided at a median part of its receptacle portion with a liquid controlling baffle with a bottom edge spaced slightly above the tray's bottom, and that portion of the handle adjacent to said tray having a liquid flow slot and said slot being selectively registrable with said second port, whereby when moved to a position registering therewith, liquid is permitted to flow from the container through said second port and slot, across and through the tray into said neck.

9. A dispensing closure for an open end liquid container comprising a cover, first and second fluid passing ports through said cover in laterally spaced relation to each other, means for selectively closing each port while simultaneously opening the other port, and receptacle means on said closure positioned outward of said ports, said receptacle means being out of fluid receiving communication with said first port when said first port is both opened and closed, said receptacle means being out of fluid communication with said second port when said second port is closed and in fluid receiving and passing communication with said second port when said second port is open.

10. The structure according to claim 9 wherein said means for selectively closing each port comprises an elongated member slidably mounted on said cover over said ports, a sleeve-like fluid passing sheath on said cover surrounding and slidably retaining said member, said sheath overlying both ports and having a discharge opening therein laterally offset from said second port, said ports being directly communicated with said sheath and selectively openable thereinto by a manipulation of said member, said receptacle means being defined in said member and located whereby fluid moving through said sheath from said second port to said discharge opening will pass therethrough.

References Cited by the Examiner

UNITED STATES PATENTS 2,018,033  10/1935  Rickerd _____ 222—559
2,622,420  12/1952  Rice _____ 222—559 X
2,673,563   3/1954  Kwast _____ 128—222

RICHARD A. GAUDET, *Primary Examiner.*

DALTON L. TRULUCK, *Examiner.*